(12) United States Patent
Baartman et al.

(10) Patent No.: US 7,640,233 B2
(45) Date of Patent: Dec. 29, 2009

(54) RESOLUTION OF ABBREVIATED TEXT IN AN ELECTRONIC COMMUNICATIONS SYSTEM

(75) Inventors: Randall Paul Baartman, Rochester, MN (US); James Edward Carey, Rochester, MN (US); Jason J. Illg, Rochester, MN (US); John Stephen Mysak, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 11/468,193

(22) Filed: Aug. 29, 2006

(65) Prior Publication Data

US 2008/0059421 A1  Mar. 6, 2008

(51) Int. Cl.
G06F 17/30 (2006.01)
G06F 17/28 (2006.01)
H04W 4/00 (2009.01)

(52) U.S. Cl. .................. 707/3; 707/10; 707/104.1; 704/2; 704/9; 715/261; 455/466

(58) Field of Classification Search .................. None
See application file for complete search history.

(56) References Cited

U.S. PATENT DOCUMENTS

| | | | |
|---|---|---|---|
| 6,014,429 A | * | 1/2000 | LaPorta et al. ............ 379/88.15 |
| 2004/0049498 A1 | * | 3/2004 | Dehlinger et al. ............ 707/3 |
| 2004/0102956 A1 | | 5/2004 | Levin |
| 2005/0120011 A1 | * | 6/2005 | Dehlinger et al. ............ 707/3 |
| 2006/0116986 A1 | * | 6/2006 | Radcliffe .................... 707/3 |
| 2006/0247916 A1 | * | 11/2006 | Fux et al. .................... 704/8 |
| 2006/0247917 A1 | * | 11/2006 | Fux et al. .................... 704/9 |
| 2007/0073517 A1 | * | 3/2007 | Panje ......................... 702/181 |
| 2007/0275740 A1 | * | 11/2007 | Deutsch et al. ............ 455/466 |

* cited by examiner

*Primary Examiner*—Pierre M Vital
*Assistant Examiner*—Christopher P Nofal
(74) *Attorney, Agent, or Firm*—Streets & Steele (57) ABSTRACT

Electronic messaging systems, a machine-accessible medium, and methods for text-based electronic communication. In one embodiment, a plurality of databases are provided. The databases each define shorthand terms with one or more longhand terms. A shorthand term is targeted within a text message, and the databases are searched for corresponding longhand terms. The longhand terms are selected for display according to factors such as user preferences, the identities of participants to the text communication, and the context of the text message. Abbreviations, shorthand, and other jargon sent by one user is thereby interpreted. For example, one of the longhand terms may be substituted in-line with the text message. Alternatively, all matches for the shorthand term found in the databases may be listed in descending order according to relevancy.

4 Claims, 4 Drawing Sheets

RESOLUTION OF ABBREVIATED TEXT IN AN ELECTRONIC COMMUNICATIONS SYSTEM

BACKGROUND OF THE INVENTION

1. Field of the Invention

The present invention relates to electronic, text-based communication.

2. Description of the Related Art

Many popular electronic, text-based communication mediums exist. Among these, the most common mediums are e-mail, instant messaging (IM), and short message service (SMS). Communication in any of these text-based mediums will be generally referred to herein as "text communication" or "text messaging." IM can be performed in a small Internet browser window, such as in a browser "chat" session, or on handheld devices such as PDAs and mobile phones. The use of SMS is particularly common on mobile phones and PDAs. E-mail can also be used for substantially real-time communication, particularly when performed on handheld devices having "push" technology for the automatic retrieval of messages from a server.

Text-based mediums tend to be a preferred means of communication, depending on the situation. By their nature, IM, SMS, and e-mail typically lend themselves to brief, spontaneous text communication. Users are frequently in a hurry, multi-tasking, or possibly on-the-go when communicating in these mediums. IM, SMS, and e-mail are therefore particularly popular for their convenience in situations where users want quick, prompt, real-time communication. Furthermore, typical browser chat windows, PDA screens, and mobile phone screens are all usually quite compact. Keyboards found on most mobile phones and PDAs are also quite compact, often requiring users to type with only a few fingers.

These factors have fostered the evolution of shorthand notation, wherein users abbreviate words and phrases to communicate using fewer keystrokes. For example, typing abbreviations like LOL ("laughing out loud") and IMO ("in my opinion") shorten the number of characters required in messages and expedite the communication process. However, as with any nonverbal communication, the effectiveness of text communication is often limited. The use of shorthand in conversational writing can make it difficult for people to understand one another. A complicating factor is that individual users commonly develop their own jargon, so that the shorthand notation of one user does not always agree with shorthand notation of another user.

While a number of software applications are available for facilitating text communication, such as IM, these applications have failed to optimally address the use of shorthand notation and evolving jargon. Confusion and misunderstandings often result due to misinterpretation. The flow of communication between users is further disrupted when one a user stops to ask another user for the meaning of a shorthand term rather than proceeding to author a reply.

Therefore, an improved electronic messaging system is needed. In particular, there is a need for easier, more efficient, and more precise ways to handle shorthand notation and jargon contained within text communication. More particularly, it would be desirable to have a method for determining the meaning of shorthand notation and jargon without interrupting the flow of communication.

SUMMARY OF THE INVENTION

The present invention provides a method of electronic communication and a machine-accessible medium containing instructions which, when executed by a machine, cause the machine to perform the method. The method comprises receiving a text communication from a sender, selecting a target term from the text communication, searching a plurality of databases for one or more alternative terms for the target term; and selectively displaying one or more of the alternative terms. The plurality of databases may include, without limitation, one or more of a sender database, a recipient database, a service provider database, and a public database. Typically, the target term is a shorthand term, and the one or more alternative terms include one or more longhand terms defined with respect to the shorthand term. Optionally, the text communication may be displayed with one of the alternative terms substituted for the target term. In a further option, the alternative terms may be displayed along with a name of the database in which each of the alternative terms was found.

In one embodiment, the method includes selecting the one or more alternative terms according to one or more factors selected from the group consisting of a sender identity, a recipient identity, and a context of the text communication. Optionally, the method may further include sorting the one or more alternative terms according to the one or more factors, and independently may further include displaying the alternative terms in the order sorted.

The present invention also provides an electronic messaging system. One embodiment of the electronic messaging system comprises a messaging client configured for text communication over a network such as the Internet or a wireless telephone network, a plurality of databases each defining one or more terms with one or more alternative terms, a term selector component included with the messaging client for selecting a target term from the text communication, a database search component included with the messaging client for searching for the target term within the plurality of databases, a term selector component for selecting alternative terms defined for the target term from the plurality of databases, and a display component for displaying the selected alternative terms. Optionally, the messaging client selects the alternative terms corresponding to the target term according to factors selected from the group consisting of a sender identity, a recipient identity, and a context of the text communication. The electronic messaging system may include a context analyzer for analyzing context of the electronic communication.

In one embodiment, the messaging client selectively displays all alternative terms defined in the plurality of databases for the target term. Still, the messaging client may display the text communication with one of the alternative terms substituted for the target term. The plurality of databases may comprise one or both of a first user-specified database and a second user-specified database. A bot can be used for transmitting data between the plurality of databases and the messaging client. The messaging client may include one of an instant messaging client, a short message service client, and an e-mail client.

DETAILED DESCRIPTION OF PREFERRED EMBODIMENTS

The present invention includes systems and methods for facilitating and enhancing electronic text communication. The systems and methods may be employed in a number of electronic messaging mediums, such as IM, SMS or e-mail. Communication in any of these text-based mediums will be generally referred to herein as "text communication" or "text messaging." Text includes any communication of written words, including text displayed as a font, html, graphical form, or other forms readable to a human user as text. By way of convention, "terms" include words and phrases, "shorthand" generally includes abbreviations and other shortened ways of writing, and "longhand" as used herein, generally includes the full-length way of writing something. For example, "IMO" is one example of a shorthand term for the longhand term "in my opinion."

Embodiments of the invention include ways to interpret terms contained within text messages, such as to convert shorthand terms to full length (i.e. "longhand") terms, or to otherwise convert jargon from one form to another. A plurality of databases may be provided that set forth alternative expressions for each term to be interpreted (the "target term"), such as may arise due to differences or nuances in context, or according to a particular user's preferences. The databases may include private, user-defined databases, as well as publicly available databases. The invention therefore includes ways of interpreting terms to resolve communication difficulties that would otherwise result from such inconsistencies. This improves and enhances text-based communication.

A set of factors may be used to select the most appropriate interpretation of a target term from among options provided in the databases. For example, the alternative terms may be ranked, classified, or otherwise arranged or prioritized, according to such factors as the identities of users involved in a text dialog, user settings or preferences, and/or the context of a text communication. If more than one entry is found for the target term among the plurality of databases, the set of alternative terms may be arranged as determined by the set of factors. The list of alternatives may then be displayed, such as in a list arranged by the set of factors. Alternatively, the "best" or most likely alternative term, as determined by the set of factors, may be substituted for the target term.

One particularly useful application of the invention is to interpret the meaning of shorthand terms. In one embodiment, a group of databases may be provided that each define one or more shorthand terms. These definitions may be structured in the database as shorthand terms paired with longhand terms. For example, one database may define the shorthand term "LOL" to mean "laughing out loud." Another database may instead define "LOL" to mean "lots of laughs." A database may also include multiple definitions for a given term. For example, a user's personal database may have two entries for the shorthand term "OMW" including "on my way" and "oh my word"

It should be noted that, in any text communication between two or more participants, the role of sender and recipient is likely to alternate. For example, a User A may send a text message containing terms to be converted to a User B. User B may receive that message and respond with another message, with respect to which User B is the sender and User A is the recipient. Thus, the role of sender and receiver is generally dynamic.

A messaging system according to the invention may convert the target terms in a text message contemporaneously with sending the test message from a sender to a recipient. This may be performed from the sender's messaging device and database(s). The sender may provide alternative terms from the sender's own personal database, as substitutions for terms contained within the text message as typed by the sender. This may be done by sending the alternative term(s) over a network (such as the Internet or a wireless telephone network), along with the text message containing the target term(s). This would preferably occur automatically, such as from the "back end" of the sender's messaging device and software to that of the receiver, but could alternatively be sent at the senders request, authorization or control. The recipient would have the option of displaying the longhand term instead of the shorthand term, which would avoid the distraction of having to ask what the shorthand term means. Alternatively, one or more of the longhand terms could be displayed in a menu bar or special window.

Alternatively, the recipient's messaging device or software may decipher a target term in an incoming electronic communication and display a corresponding alternative term according to the recipient's personal database. This may be practical in instances where, for example, a sender's personal database does not include any alternative terms for a particular target term. Another practical application of this embodiment recognizes that two different senders may mean different things by a particular shorthand term. The recipient may customize her own personal database to include different entries for different senders. For example, the recipient may setup her system so that, "when George sends me 'OMW,' it will be replaced with "oh my word," and "when Mary sends 'OMW,' it will be replaced with 'on my way.'"

In another embodiment, longhand terms may be converted to shorthand terms, rather than from shorthand to longhand. For example, User A may use a computer to communicate with User B, who is using a PDA. Having the advantage of a full size computer screen to display many alphanumeric characters, User A may easily type out messages using full-length longhand terms. User B, by contrast, may want to reduce the number of alphanumeric characters to better fit the smaller PDA screen, and to minimize any scrolling. In this embodiment, longhand terms included in messages received by User B from User A may be converted to shorthand terms for the benefit of User B. It should also be recognized that User B might convert familiar longhand to shorthand to save screen space, while in the same message also electing to convert unfamiliar shorthand to longhand to aid comprehension. Such elections can be setup to occur automatically.

As noted above, the invention is not limited to converting between shorthand and longhand. In some embodiments, a database may include any desired word substitutions. For example, a recipient may personalize a database so that the informal phrase "wassup?" is substituted for the more formal term "how are you doing?" in any incoming text messages.

The context of a text communication may be used as a factor in the selection of alternative terms. A number of context analysis algorithms are known in the art for analyzing the context of parsed electronic communication. These include algorithms such as topic detection and tracking (TDT) and local context analysis (LCA). A context analyzer may be used to actively determine the context of text communication, and assign greater weight to those shorthand terms that appear in a database related to that context. For example, two users discussing sports may intend the shorthand term "TD" to mean "touchdown," whereas in the context of work the intended meaning may be "timing diagram." The plurality of databases may include a "work related" database and a "sports related" database. Where the context analyzer determines the topic to be sports, the term "touchdown" may be substituted for TD. Where the context analyzer determines the topic to be work-related, the term "timing diagram" may instead be substituted for TD. In another example, one LCA algorithm might interpret TD as "touchdown" when preceded by the word "scored", and interpret TD as "timing diagram" when preceded by the words "provided", "drew", "designed", and so forth.

Additionally, a messaging system according to the invention may launch a Web search for one or more databases having a selected target term. This search may be performed immediately and automatically, and the conversion from shorthand to longhand may either be done immediately or displayed as just one option in a listing of possible conversions. Alternatively, the Web search may be performed upon instruction or command from the recipient.

Figure 1:
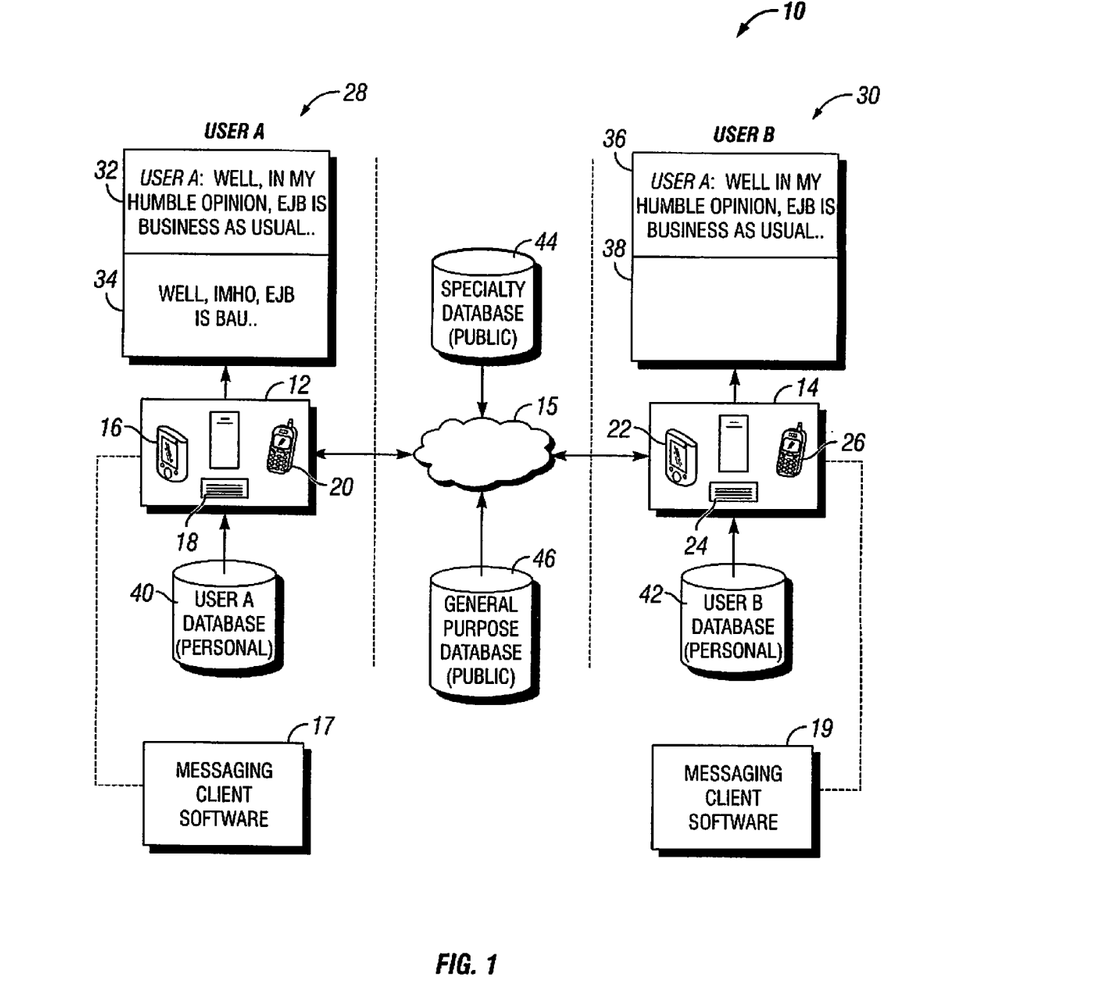
FIG. 1 is a schematic diagram of an electronic messaging system according to an embodiment of the invention.

FIG. 1 is a schematic diagram of an electronic messaging system 10 according to one embodiment of the invention. A first communication device 12 is connected to a second communication device 14 through the internet 15, other type of network such as a wireless telephone network, or a combination of networks or types of networks. As indicated in the drawing, non-limiting examples of the first device may be a PDA 16, a personal computer 18, or a cell phone 20. Independent from the first device, non-limiting examples of the second communication device 14 may be another PDA 22, personal computer 24, or cell phone 26. The first and second communication devices 12, 14 need not be the same type in order to communicate with one another. For example, the PDA 16 may communicate with the cell phone 26 via SMS over a wireless telephone network, or the personal computer 18 may communicate with the PDA 22 via IM. The first communication device 12 includes a text input device, such as a keyboard or handwriting recognition system, and a display allowing a first user ("User A") to interface with the first communication device 12. Likewise, the second communication device 14 includes a text input device and a display for a second user ("User B") to interface with the second communication device 14. Thus, User A and User B may communicate with each other using their respective communication devices 12, 14, such as by typing message on keyboards and viewing messages on the display.

To establish text communication between the first and second communication devices 12, 14, the messaging system 10 includes a first messaging client 17, which may reside on the first communication device 12 as shown, or on a remote server on the Internet 15. A second messaging client 19 may reside on the second communication device 14 or on a remote server on the Internet 15. A messaging client is a software application for sending and receiving messages, and other tasks related to text messaging. For example, an e-mail client may be a software program enabling a user to send and receive e-mail; an IM client may be a software application for sending and receiving instant messages, and an SMS client may be a software application for sending and receiving SMS messages on a cell phone or PDA.

In this embodiment, the messaging system 10 includes a plurality of databases, such as a personal database 40 for User A, a personal database 42 for User B, a specialty database 44, and a general purpose database 46. The personal databases 40, 42 may respectively reside with the first and second messaging clients 17, 19, or may be stored on a remote server accessible over the Internet 15. User A may optionally create and modify the personal database 40, such as by adding or removing entries. Likewise, User B may optionally create and modify the personal database 42. The specialty database 44 and general purpose databases 46 may reside on one or more remote servers that are publicly available over the internet 15. These public databases 44 and 46 may be administered by a Web master having dominion over the servers on which the public databases 44 and 46 reside.

The various databases may be accessed in a number of ways. In one configuration, the databases may be automatically accessed by the messaging clients 17, 19. For example, the second messaging client 19 may automatically access User A's personal database 40 via the Internet 15 or other network connection. A "bot" may be provided for this purpose, to transfer data between a back end of the first messaging client and a back end of the second messaging client, requiring little or no affirmative steps on the part of User A or User B.

Each of the databases 40, 42, 44, 46 contains a set of shorthand (target) terms and related longhand (alternative) terms. For example, the specialty database 44 may be a database containing specialized technical terms related to computers and software, such as DASD ("direct access storage device"). The general purpose database 46 may contain more general terms with at least one meaning that is commonly accepted by the general public, such as FYI ("for your information"). The personal databases 40, 42 may be populated with shorthand terms and their longhand alternative(s) as defined or modified by User A and User B.

Databases may vary in structure, depending on the type of database. For example, a database may be personal, public, specialty, or general purpose. In a public database, the same set of entries may be available to anyone who accesses the public database. For example, an online database of shorthand notation may provide all users access to essentially the same set of shorthand terms and alternative longhand terms. That information is not necessarily static, however, and may be continuously updated or revised. A personal database, by contrast, may contain multiple sets of entries. For example, User A's personal database may contain one set of terms and definitions for dialogs with User B, and another set of terms and definitions for dialogs with User C.

A first exemplary dialog box 28 is shown as it may be displayed on the first communication device 12, and a second exemplary dialog box 30 is shown as it may be displayed on the second communication device 14. The dialog boxes 28, 30 may be, for example, chat windows displayed on the respective communication devices 12, 14 as created and controlled by the messaging clients 17, 19. An upper window 32 on the first dialog box 28 and an upper window 36 on the second dialog box 30 may, for example, display a running text dialog between User A and B. A lower window 34 may display a text communication as it is being typed by User A, prior to sending. User A may send the typed text message to the second messaging client, such as by clicking 'Enter' on the keyboard or clicking a 'Send' button on the display. The message is sent over the internet 15 or other network, received by the second messaging client, and displayed on an upper window 36 of the dialog box 30, where User B can read the text message. The message from User A is displayed on the lower window 34 exactly as typed, including the various shorthand terms. Meanwhile, the message is optionally displayed in the upper windows 32, 36 with the shorthand converted to longhand according to one of the databases 40, 42, 44, 46. The conversion from shorthand to longhand in the dialog box 30 of FIG. 1 is further explained with reference to the method outlined in FIG. 2.

Figure 2:
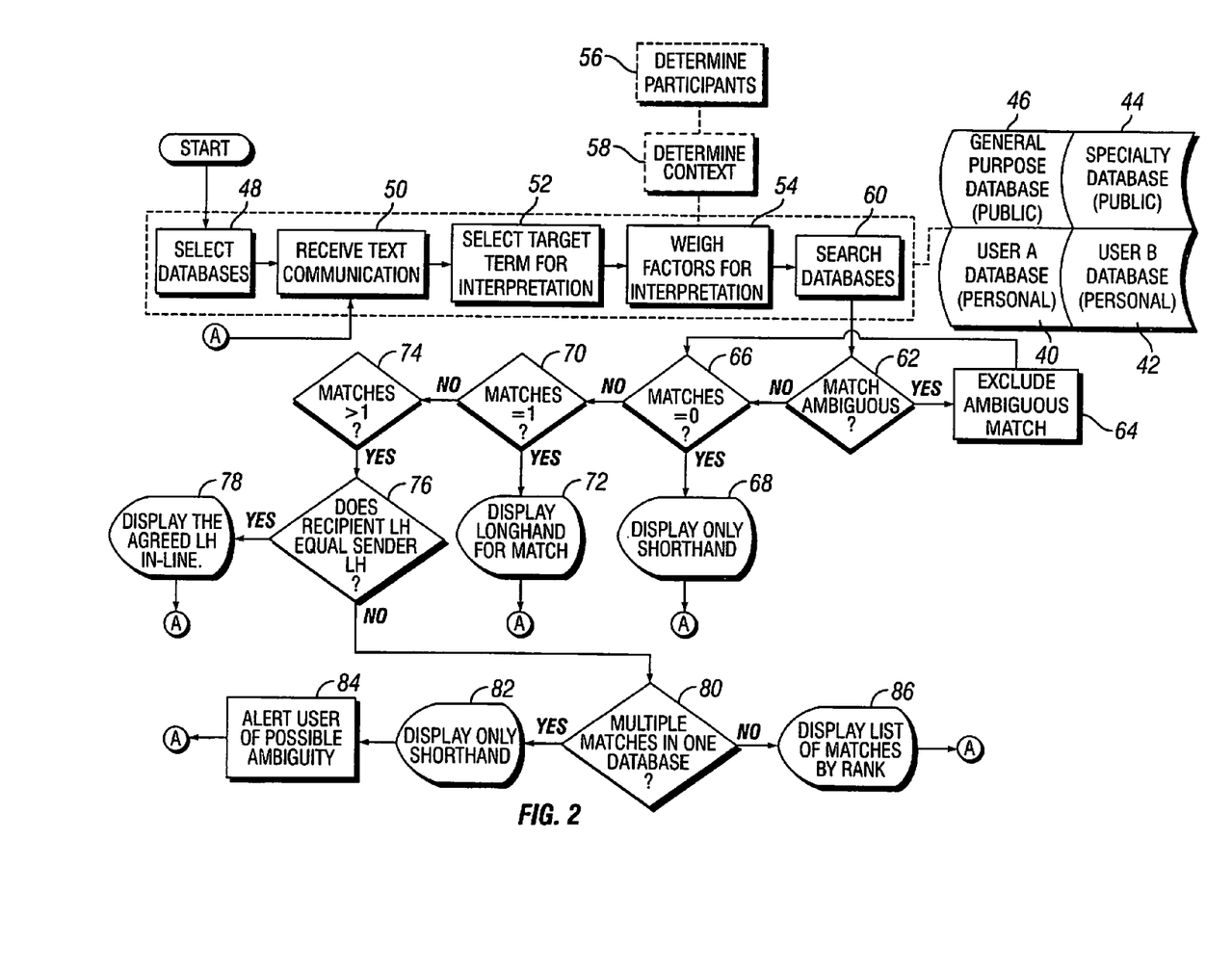
FIG. 2 is a flowchart of a method of electronic communication using the electronic messaging system of FIG. 1.

FIG. 2 is a flowchart of one embodiment of a method of electronic communication. The steps of the flowchart are outlined in only one possible order, and those skilled in the art will recognize that the order of at least some of the steps may be arranged differently. Although the roles of sender and recipient are dynamic, the method will be explained in the instance where User A is the sender and User B is the recipient, by way of example. In step 48, the set of databases 40, 42, 44, and 46 are selected from a potentially unlimited number of sources for use by User B. For example, the personal database 40, although associated with User A, may be selected by User B for translating some of User A's terms. Others databases, such as the specialty database 44 and the general purpose database 46, may be obtained through the internet, such as from a service provider, or from an online source. Each database defines a set of terms. For example, the general purpose database 46 may define each of a set of shorthand terms with a corresponding, widely recognized longhand term. Thus, the database 46 may be used to interpret a shorthand term by converting it to its recognized longhand equivalent. Alternatively, the terms may be user-defined. For example, the personal database 42 may associate shorthand terms with longhand terms as defined by User B. Again, embodiments of the invention are not limited to the conversion of shorthand to longhand, although that application of the invention will be discussed further for illustration.

These databases may be selected by a user during setup of user preferences. These preferences may identify specific general and/or specialty databases, but may also identify contextual rules for automatically identifying a database as needed, such as a rule to always consult or accept information from the sender's database. Other preferences might include automatic or prompted inclusion of new entries into the personal database.

In step 50, User B receives a text message from User A. In step 52, a target term is selected from the text communication. In step 60, the databases will be searched for the target term, to determine one or more alternative terms. At some point in the process, which may occur before or after step 60, a set of factors is determined and weighed in step 54 for prioritizing any alternative terms found for the target term. The factors may be continuously modified and updated with each text message, or possibly at other intervals. One factor that may be considered is the identity of participants to the dialog. For example, in optional step 56, the participants in the dialog may be determined to be User A and User B. Because User A is involved in this dialog, User B may logically expect User A's intent to be an important factor (or possibly the sole factor) in best interpreting the target term in a message sent by User A. Thus, User B (or User B's messaging client software) may choose to assign any alternative terms found in User A's database 40 the highest priority. If the target term is found in User A's personal database, an equivalent term in that database may instead be given priority.

The context of a communication may be another important factor for prioritizing the results of a search. In optional step 58, the context of the text communication may be determined after step 52, according to context analyzers known in the art. For example, if the context of the communication relates to computers or software, any equivalent terms found in the specialty database 44 may be assigned a rank that supersedes any equivalent terms found in User A's own personal database 40. In fact, some shorthand may be so widely familiar that it does not appear in User A's personal database, such as the use of CPU as shorthand for "central processing unit."

Alternatively, User A and User B may manually assign a hierarchy to the databases to be used by default. User B's selected hierarchy might be, for example: (1) User A's personal database 40, (2) the specialty database 44, (3) User B's own personal database 42, and (4) the general purpose database 46. It is also appreciated that if User A's database is given first priority and User A's database does in fact contain an entry for the target term, then it may not be required to ever even identify what database, if any, would have been ranked second, third or further.

With the factors weighed and/or hierarchy of databases established, the received text message may be analyzed to identify target term(s). For example, identifying possible shorthand terms in the text communication may simply involve searching the databases (step 60) and comparing alphanumeric strings within the text message to shorthand terms listed in the various databases, to determine one or more matches. Another way to identify possible shorthand terms would be to search a dictionary database (presumptively containing only full-length terms), and by a process of negative implication, select only those terms in the text communication that are not found in longhand form in the dictionary database. Each possible shorthand term in the text communication may appear in none, some, or all of the databases. For example, a specialized shorthand term like DASD ("direct access storage device") may only appear in the Specialty database 44. Another, more common term, like IMO ("in my opinion"), may appear both in the User A database 40 and the User B database 42, as well as in the General Purpose database 46, but probably not in the Specialty database 44. The matched terms may then be analyzed, at least in part, according to the hierarchy that was established in step 54. A shorthand term may also appear more than once in a particular database, if there are more than one possible interpretation of that shorthand term.

In step 62, a matched shorthand term may be evaluated to determine if it is ambiguous. For example, ambiguity may arise where a character string is both a shorthand term and a longhand term having different meanings. Alternatively, a character string may not be identifiable as either shorthand or longhand. If the shorthand term is ambiguous for these or other reasons, the term may be excluded from conversion or translation in step 64.

The total number of matches for the target term found in all the selected databases may determine how shorthand terms are interpreted, ranked, or displayed. In step 66, if no matches are found (matches=0), then the target term is not converted, and only the target term may be displayed in step 68. If exactly one match is found for the target term in all the databases (step 70), then the one equivalent term to which the target term is paired is converted and/or displayed in step 72. If there is more than one match in step 74, then a number of possible courses of action may be followed. In step 76, if related terms are found in both User A's personal database and in User B's personal database, then the target term may be converted to that particular related term, and optionally displayed in-line in step 78. This is because if both users agree on a term's meaning, then that is probably the intended meaning. However, if more than one match for the shorthand term are located in any one database, in step 80, then another potential ambiguity arises according to step 62. Without more information, the correct longhand term may be indeterminable, and no conversion may occur according to step 82. User B may be alerted to the possibly ambiguity in step 84. Alternatively, the context of the communication may determine which longhand term is more likely correct. Otherwise, in step 86, all the matches may be displayed. In one example, the highest ranking term may be substituted in-line for the shorthand term. Alternatively, a list of terms may be displayed in the order of the ranking of the databases from which they were converted. These optional display formats are discussed further in reference to FIGS. 3 and 4.

Figure 3:
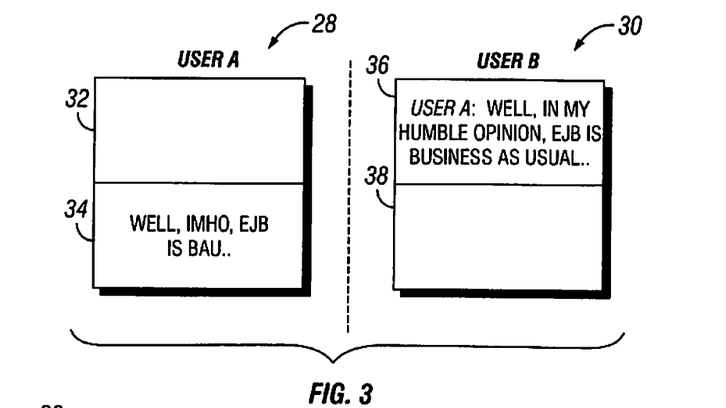
FIG. 3 is a schematic diagram of an embodiment displaying converted text in-line with a received text communication.

FIG. 3 is a schematic diagram of an embodiment of displaying converted text in-line with a received text communication. An in-line substitution displays the text communication with the longhand term substituted for the shorthand term. The shorthand terms IMHO and BAU were both found in at least one of the databases. The shorthand terms are displayed as typed, with no conversion, in the lower box 34 of User A's dialog box 28. These terms were converted to their selected longhand counterparts in the upper window 36 of the dialog box 30. The term EJB, however, remains unconverted. The term EJB may not have been found in any database, or there may have been multiple matches in one of the databases, or the term may have otherwise been ambiguous. Another possibility is that EJB are the initials of a person or a company, requiring no conversion to longhand. Optionally, the substituted longhand term may be displayed in a different font to alert the reader, namely User B, that a substitution has occurred and possibly provide a link that would allow User B to see the original shorthand.

Figure 4:
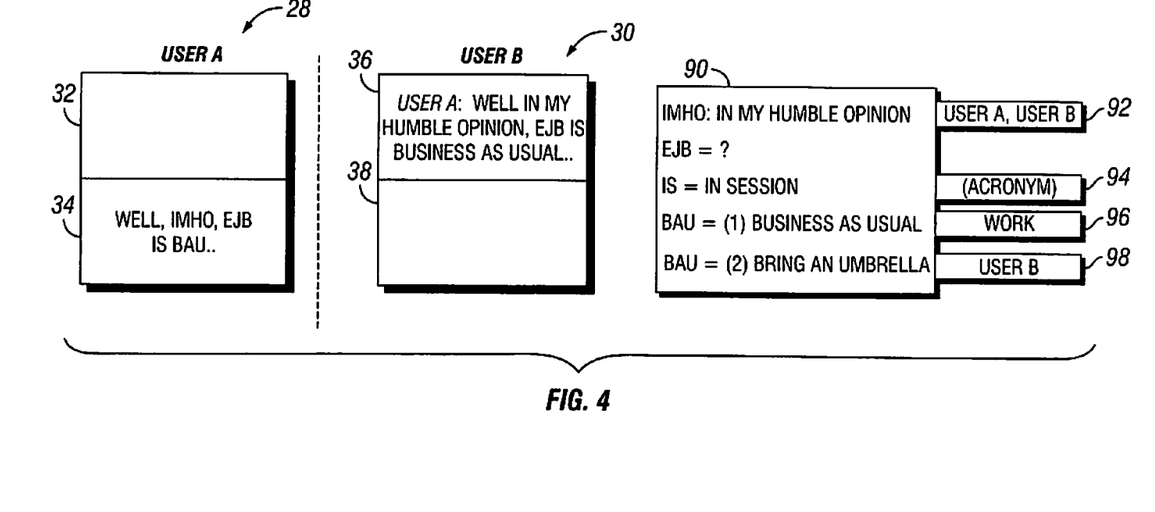
FIG. 4 is a schematic diagram of an embodiment displaying converted text listed according to its ranking within a database hierarchy.

FIG. 4 is a schematic diagram of an embodiment of displaying converted text listed according to its ranking within a database hierarchy. Again, the text communication is displayed along with the shorthand terms as typed, with no conversion, in the lower box 34 of User A's dialog box 28. This time, the text communication is also displayed without conversion in the upper window 36 of User B's dialog box 30. However, information about possible interpretations of the shorthand terms is supplied. For example, a pop-up window 90 displays all the shorthand terms and the longhand equivalents found in the databases. The selected translation for IMHO is shown in the pop-up window 90. A sub-window 92 indicates that the same definition for the shorthand term was located in both the personal database of User A and the personal database of User B. No matching shorthand was found in any of the listed databases for EJB, and a "?" is displayed indicating a possibly unconverted shorthand term. A shorthand term "is" is displayed with a suggested longhand conversion "in session." However, as identified in sub-window 94, the term "is" may be an expression of either shorthand or longhand, which illustrates one type of ambiguity discussed with reference to the flowchart of FIG. 2. In this instance, User B may resolve the ambiguity based on context. Alternatively, User B's messaging client may optionally contain a grammar analysis component to determine the most appropriate selection. Finally, at least two matches were found for BAU. In a specialty Work database, the term means "business as usual" (sub-window 96), whereas the term means "bring an umbrella" in User B's database (sub-window 98). These two alternative conversions are displayed in order of the established hierarchy for the databases. For example, an optional context analyzer may have determined this communication dealt with work, giving priority to the definition located in the Work database. The pop-up window 90 and sub-windows 92-98 may be displayed automatically, or in response to User B clicking in the upper window 36, such as by right clicking over a particular shorthand term. Other embodiments of list-style displays will be apparent to one skilled in the art in the context of this disclosure.

It should be recognized that the invention may take the form of an entirely hardware embodiment, an entirely software embodiment, or an embodiment containing both hardware and software elements. In particular embodiments, including those embodiments of methods, the invention may be implemented in software, which includes but is not limited to firmware, resident software and microcode.

Furthermore, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
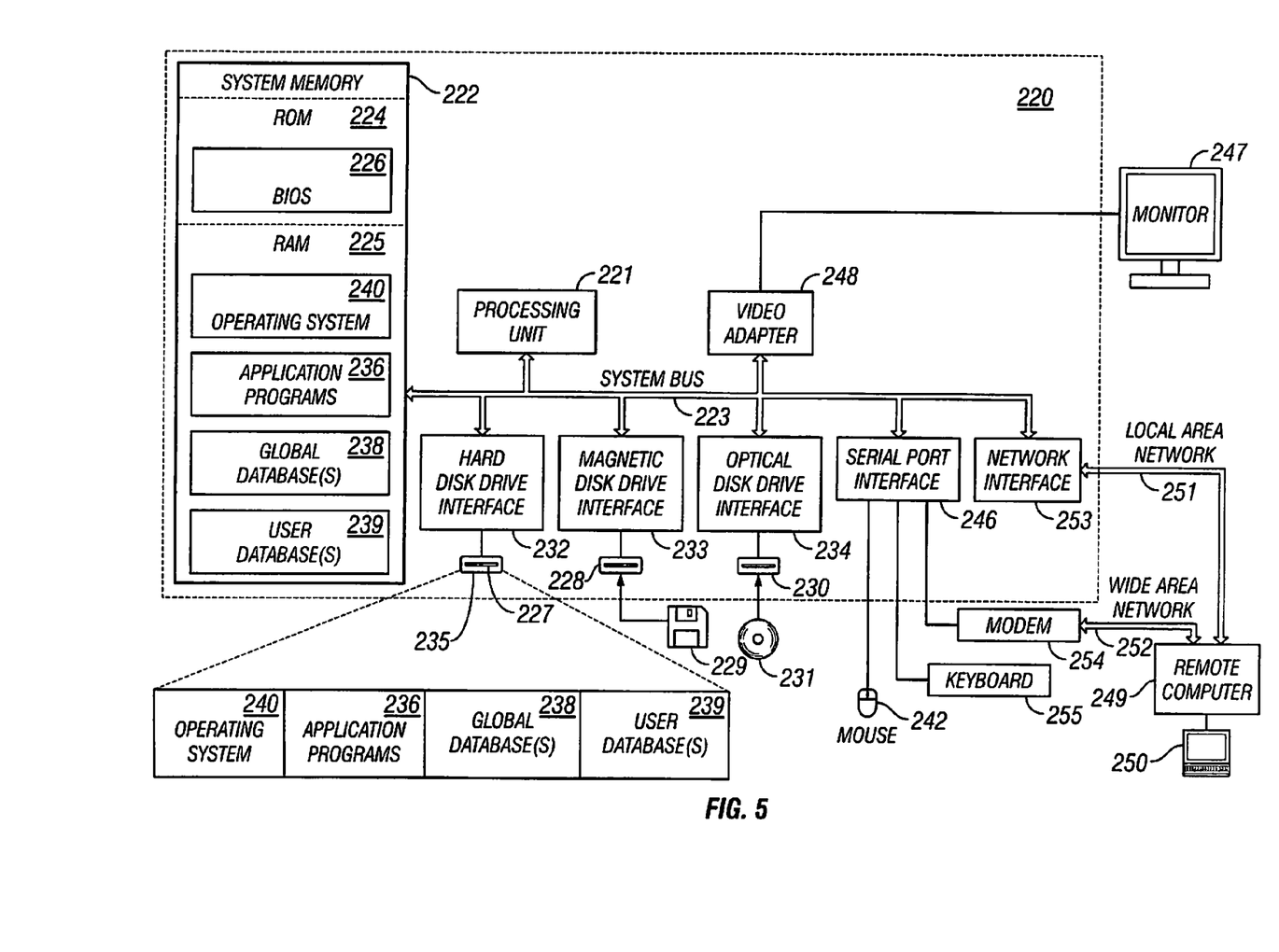
FIG. 5 is a schematic diagram of a computer system that may be configured for text-based electronic communication according to an embodiment of the invention.

To illustrate, FIG. 5 is a schematic diagram of a computer system generally indicated at 220 that may be configured for facilitating text-based electronic communication according to an embodiment of the invention. The computer system 220 may be a general-purpose computing device in the form of a conventional computer system 220. Generally, computer system 220 includes a processing unit 221, a system memory 222, and a system bus 223 that couples various system components, including the system memory 222 to processing unit 221. System bus 223 may be any of several types of bus structures including a memory bus or memory controller, a peripheral bus, and a local bus using any of a variety of bus architectures. The system memory includes a read only memory (ROM) 224 and random access memory (RAM) 225. A basic input/output system (BIOS) 226, containing the basic routines that help to transfer information between elements within computer system 220, such as during start-up, is stored in ROM 224.

Computer system 220 further includes a hard disk drive 235 for reading from and writing to a hard disk 227, a magnetic disk drive 228 for reading from or writing to a removable magnetic disk 229, and an optical disk drive 230 for reading from or writing to a removable optical disk 231 such as a CD-R, CD-RW, DV-R, or DV-RW. Hard disk drive 235, magnetic disk drive 228, and optical disk drive 230 are connected to system bus 223 by a hard disk drive interface 232, a magnetic disk drive interface 233, and an optical disk drive interface 234, respectively. Although the exemplary environment described herein employs hard disk 227, removable magnetic disk 229, and removable optical disk 231, it should be appreciated by those skilled in the art that other types of computer readable media which can store data that is accessible by a computer, such as magnetic cassettes, flash memory cards, digital video disks, Bernoulli cartridges, RAMs, ROMs, USB Drives, and the like, may also be used in the exemplary operating environment. The drives and their associated computer readable media provide nonvolatile storage of computer-executable instructions, data structures, program modules, and other data for computer system 220. For example, the operating system 240 and application programs 236 may be stored in the RAM 225 and/or hard disk 227 of the computer system 220.

A user may enter commands and information into computer system 220 through input devices, such as a keyboard 255 and a mouse 242. Other input devices (not shown) may include a microphone, joystick, game pad, touch pad, satellite dish, scanner, or the like. These and other input devices are often connected to processing unit 222 through a USB (universal serial bus) 246 that is coupled to the system bus 223, but may be connected by other interfaces, such as a serial port interface, a parallel port, game port, or the like. A display device 247 may also be connected to system bus 223 via an interface, such as a video adapter 248. In addition to the monitor, personal computers typically include other peripheral output devices (not shown), such as speakers and printers.

The computer system 220 may operate in a networked environment using logical connections to one or more remote computers 249. Remote computer 249 may be another personal computer, a server, a client, a router, a network PC, a peer device, a mainframe, a personal digital assistant, an internet-connected mobile telephone or other common network node. While a remote computer 249 typically includes many or all of the elements described above relative to the computer system 220, only a memory storage device 250 has been illustrated in FIG. 5. The logical connections depicted in the figure include a local area network (LAN) 251 and a wide area network (WAN) 252. Such networking environments are commonplace in offices, enterprise-wide computer networks, intranets, and the internet.

When used in a LAN networking environment, the computer system 220 is often connected to the local area network 251 through a network interface or adapter 253. When used in a WAN networking environment, the computer system 220 typically includes a modem 254 or other means for establishing high-speed communications over WAN 252, such as the internet. Modem 254, which may be internal or external, is connected to system bus 223 via USB interface 246. In a networked environment, program modules depicted relative to computer system 220, or portions thereof, may be stored in the remote memory storage device 250. It will be appreciated that the network connections shown are exemplary and other means of establishing a communications link between the computers may be used.

Program modules may be stored on hard disk 227, optical disk 231, ROM 224, RAM 225, or even magnetic disk 229. The program modules may include portions of an operating system 240, application programs 236, or the like. At least one global database 238 may be included, containing a set of shorthand terms and one or more associated longhand terms for each shorthand term. The database 238 may identify both general purpose and specialized or technical databases that may be consulted. One or more user database 239 may also be included, containing a set of shorthand terms and one or more associated longhand terms for each shorthand term. The user databases 239 may be user defined and/or user-customized.

Aspects of the present invention may be implemented in the form of application program 236. Application program 236 may be informed by or otherwise associated with global database 238 and/or user database 239. The application program 236 generally comprises computer-executable instructions for facilitating text-based electronic communication, including conversion of shorthand terms according to the databases 238 and 239.

While FIG. 5 illustrates a computer system 220 capable of facilitating electronic communication according to the invention, one skilled in the art having benefit of this disclosure will understand that the methods discussed herein are equally applicable to communication between other devices, such as between two PDAs or two mobile phones over a wireless telephone and/or Internet-based network, or between dissimilar devices, such as between a computer and a wireless phone, a computer and a PDA, or a PDA and a wireless phone.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer-implemented method of automatically determining the meaning of a shorthand notation in an electronic communication, the method comprising:

receiving, on a recipient messaging device, a text communication sent from a sender messaging device, wherein the text communication comprises at least one shorthand term;

automatically analyzing, on the recipient messaging device, the context of the text communication to automatically select one or more shorthand target terms from the text communication;

searching one or more databases from a plurality of databases to obtain one or more longhand terms for the one or more shorthand target terms, wherein the one or more longhand terms are defined with respect to the one or more shorthand target terms and wherein the one or more databases are selected from the group consisting of a personal database, a general purpose database, and a specialty database;

automatically evaluating the one or more longhand terms to determine whether the one or more shorthand target terms is ambiguous in the context of the communication, wherein the evaluating comprises determining a number of matching longhand terms to identify one or more unambiguous alternative longhand terms; and automatically displaying, on the recipient messaging device, one or more of the unambiguous longhand terms proximate to, or within, the original text communication, wherein the displaying further comprises ranking the unambiguous longhand terms obtained from the one or more databases according to at least one of a sender identity and a recipient identity.

2. The method of claim 1, further comprising displaying a name of each database in which each of the unambiguous longhand terms was obtained.

3. A machine-accessible medium containing instructions, which when executed by a recipient messaging device, causes the recipient messaging device to perform operations comprising:

receiving, on the recipient messaging device, a text communication sent from a sender messaging device, wherein the text communication comprises at least one shorthand term;

automatically analyzing the context of the text communication to automatically select one or more shorthand target terms from the text communication;

searching one or more databases from a plurality of databases to obtain one or more longhand terms for the one or more shorthand target term, wherein the one or more longhand terms are defined with respect to the one or more shorthand target terms and wherein the one or more databases are selected from the group consisting of a personal database, a general purpose database, and a specialty database;

automatically evaluating the one or more longhand terms to determine whether the one or more shorthand target terms is ambiguous in the context of the communication, wherein the evaluating comprises determining a number of matching longhand terms to identify one or more unambiguous alternative longhand terms; and automatically displaying, on the recipient messaging device, one or more of the unambiguous longhand terms proximate to, or within, the original text communication, wherein the displaying further comprises ranking the unambiguous longhand terms obtained from the one or more databases according to at least one of a sender identity and a recipient identity.

4. The machine-accessible medium of claim 3, wherein the operations further comprise displaying a name of the database in which each of the unambiguous longhand terms was obtained.

* * * * *